United States Patent
Bai et al.

(10) Patent No.: US 11,599,118 B2
(45) Date of Patent: Mar. 7, 2023

(54) GAIT PLANNING METHOD, COMPUTER-READABLE STORAGE MEDIUM AND ROBOT

(71) Applicant: UBTECH ROBOTICS CORP LTD, Shenzhen (CN)

(72) Inventors: Jie Bai, Shenzhen (CN); Ligang Ge, Shenzhen (CN); Yizhang Liu, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 333 days.

(21) Appl. No.: 17/137,429

(22) Filed: Dec. 30, 2020

(65) Prior Publication Data
US 2022/0043453 A1   Feb. 10, 2022

(30) Foreign Application Priority Data

Aug. 4, 2020   (CN) .......................... 202010773787.0

(51) Int. Cl.
G05D 1/02   (2020.01)
B62D 57/032   (2006.01)

(52) U.S. Cl.
CPC .......... *G05D 1/0223* (2013.01); *B62D 57/032* (2013.01)

(58) Field of Classification Search
CPC .............................. B62D 57/032; G05D 1/0223
See application file for complete search history.

(56) References Cited

U.S. PATENT DOCUMENTS

2021/0237265 A1*   8/2021   Zhu .................. B62D 57/032

OTHER PUBLICATIONS

Guo et al. "A Modified Gait Generator for Humanoid Robots Based on Height Compensation of Center of Mass". Dec. 5-10, 2014. Proceedings of the 2014 IEEE International Conference on Robotics and Biomimetics, pp. 1278-1283 (Year: 2014).*
Caron, Stephane. "Biped Stabilization by Linear Feedback of the Variable-Height Inverted Pendulum Model". May 31-Aug. 31, 2020. 2020 IEEE International Conference on Robotics and Automation (ICRA). pp 9781-9788 (Year: 2020).*
Tian et al. "Walking Pattern Generation Using Quintic Spline Function Based on Human Motion Capture". Dec. 12-15, 2018. Proceedings of the 2018 IEEE International Conference on Robotics and Biomimetics, pp. 575-580 (Year: 2018).*

* cited by examiner

*Primary Examiner* — Nicholas Kiswanto

(57) ABSTRACT

A gait planning method includes: performing a gait planning in each center of mass (CoM) timing period of the robot based on a variable-height linear inverted pendulum model, which includes: acquiring a first step length and a second step length at a beginning of each CoM timing period; calculating a first height reduction amplitude and a first fluctuation amplitude of the CoM of the robot according to the first step length; calculating a second height reduction amplitude and a second fluctuation amplitude of the CoM of the robot according to the second step length; and performing a planning to the height of the CoM of the robot in the current CoM timing period, based on the first height reduction amplitude, the first fluctuation amplitude, the second height reduction amplitude, and the second fluctuation amplitude.

18 Claims, 11 Drawing Sheets

GAIT PLANNING METHOD, COMPUTER-READABLE STORAGE MEDIUM AND ROBOT

CROSS REFERENCE TO RELATED APPLICATIONS

This application claims priority to Chinese Patent Application No. CN202010773787.0, filed Aug. 4, 2020, which is hereby incorporated by reference herein as if set forth in its entirety.

BACKGROUND

1. Technical Field

The present disclosure generally relates to robots, and particularly to a gait planning method and a robot.

2. Description of Related Art

A key issue in the research of humanoid robots is to increase walking speed while maintaining walking stability. The walking mode generated based on the Linear Inverted Pendulum Mode (LIPM) is one of the most important methods of biped robot gait planning. However, the LIPM-based gait planning method requires keeping the height of the center of mass of the robots constant, and there will be insufficient leg length when the robots walk fast with long steps.

Therefore, there is a need to provide a gait planning method and a robot to overcome the above-mentioned problem.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
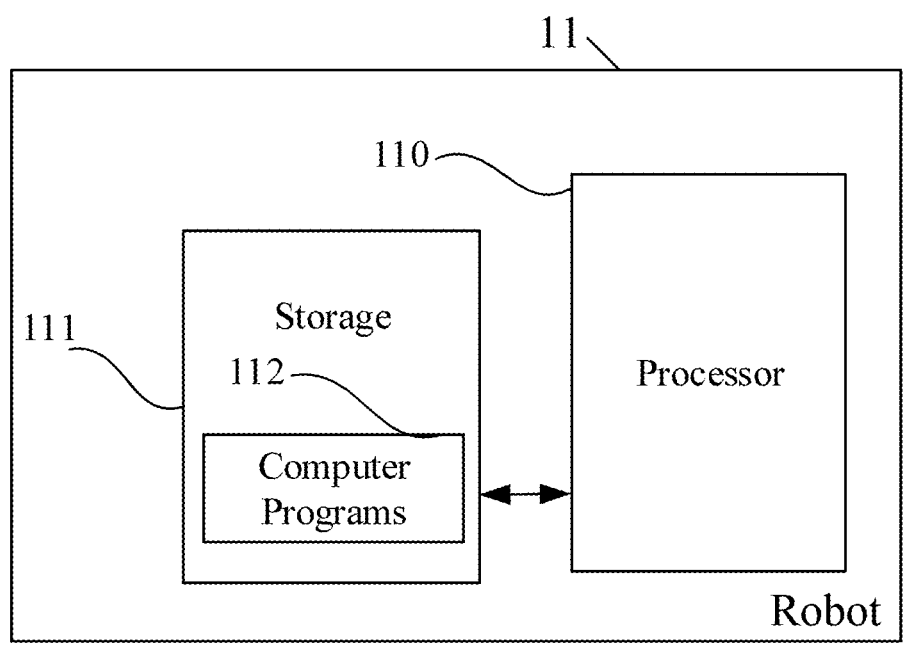
FIG. 1 is a schematic block diagram of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 11:
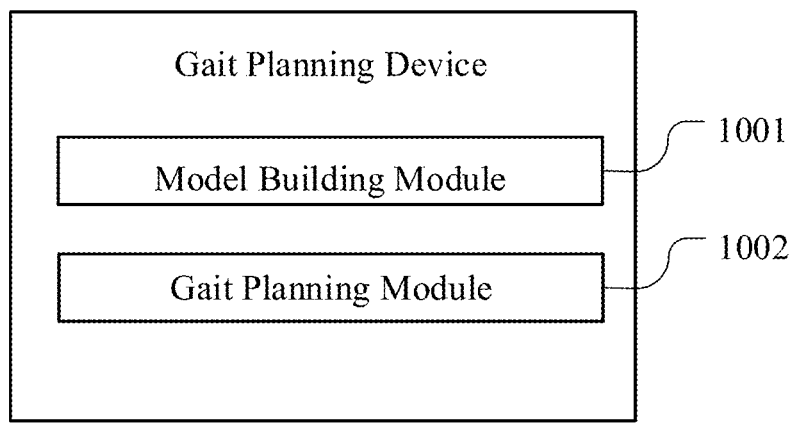
FIG. 11 is a schematic block diagram of a gait planning device according to one embodiment.

FIG. 1 is a schematic block diagram of a robot 11 according to one embodiment. The robot 11 may be a biped robot. The robot 11 includes a processor 110, a storage 111, one or more computer programs 112 stored in the storage 111 and executable by the processor 110. When the processor 110 executes the computer programs 112, the steps in the embodiments of the method for controlling the robot 11, such as steps S101 through S102 in FIG. 2, steps S1021 to S1024 in FIG. 9, and functions of modules/units in the embodiments, such as units 1001 and 1002 in FIG. 11 are implemented.

Exemplarily, the one or more computer programs 112 may be divided into one or more modules/units, and the one or more modules/units are stored in the storage 111 and executed by the processor 110. The one or more modules/units may be a series of computer program instruction segments capable of performing specific functions, and the instruction segments are used to describe the execution process of the one or more computer programs 112 in the robot 11. For example, the one or more computer programs 112 may be divided into a model building module and a gait planning module. The specific functions of each module will be described in detail later.

It should be noted that FIG. 1 is merely an example of the robot 11, and does not limit the robot 11. The robot 11 may include components different in numbers from those illustrated, or incorporate some other different components. For example, the robot 11 may further include an input and output device, a network access device, a bus, and the like.

The processor 110 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 111 may be an internal storage unit of the robot 11, such as a hard disk or a memory. The storage 111 may also be an external storage device of the robot 11, such as a plug-in hard disk, a smart memory card (SMC), and a secure digital (SD) card, or any suitable flash cards. Furthermore, the storage 111 may also include both an internal storage unit and an external storage device. The storage 111 is used to store computer programs, other programs, and data required by the robot. The storage 111 can also be used to temporarily store data that have been output or is about to be output.

Figure 2:
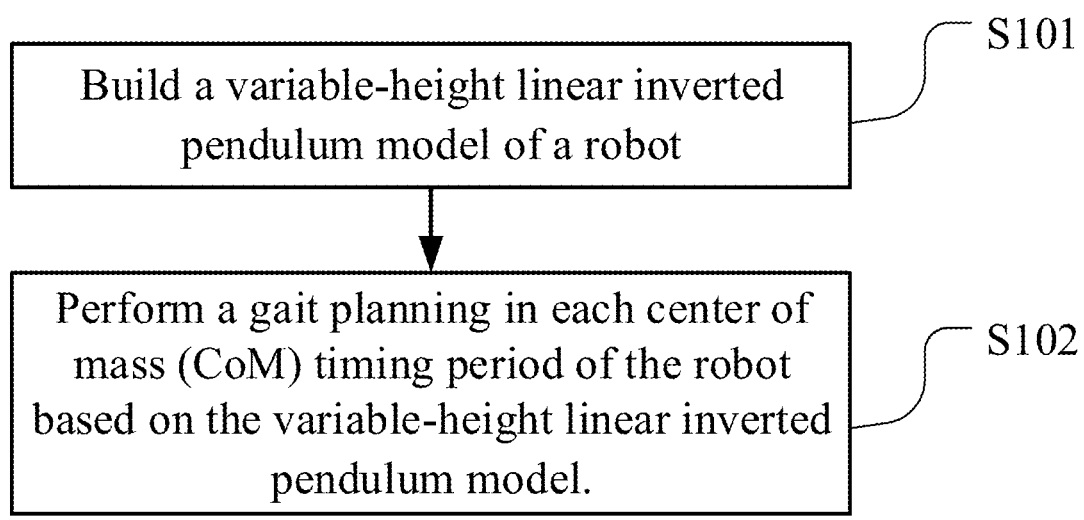
FIG. 2 is a schematic flowchart of a gait planning method according to one embodiment.

FIG. 2 shows an exemplary flowchart of gait planning method that may include the following steps.

Step S101: Build a variable-height linear inverted pendulum model. In the embodiment, the variable-height linear inverted pendulum model is a modified linear inverted pendulum model (LIPM) based on variable height. In the model, the height of the center of mass (CoM) of a robot is reduced and the fluctuation of the position of the center of mass (CoM) of a robot is included.

Figure 3:
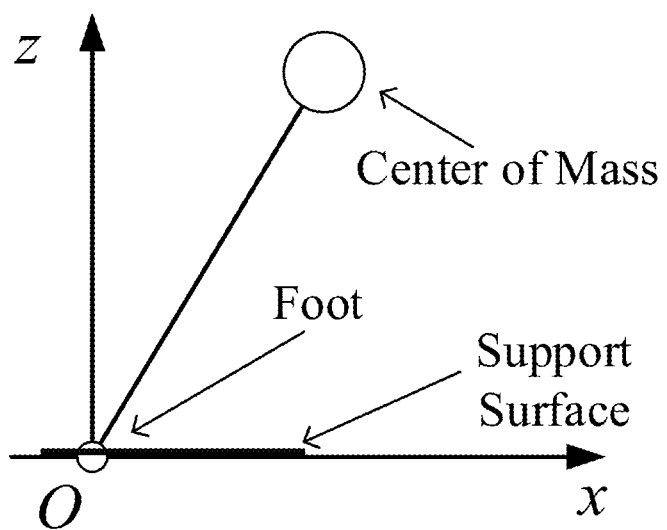
FIG. 3 is a schematic diagram of a linear inverted pendulum model (LIPM).

FIG. 3 shows a schematic diagram of a LIPM model, where the positive direction of the x-axis is the traveling direction of the robot, the z-axis is vertical and points away from the ground, and the x-axis, the y-axis and the z-axis conform to the right-hand rule. The zero moment point (ZMP) and the support point of a foot of the robot in contact with a support surface (i.e., ground, floor, etc.) are coincident. According to the dynamic model, the relationship between ZMP and the CoM (i.e., the waist of the $$x_p = x - \frac{z}{\ddot{z}+g}\ddot{x}$$

robot) is as follows:

$$y_p = y - \frac{z}{\ddot{z}+g}\ddot{y},$$

where the coordinates of the ZMP are $(x_p, y_p, 0)$, the coordinates of the CoM of the robot are $(x, y, z)$, $\ddot{x}$, $\ddot{y}$, and $\ddot{z}$ represent the acceleration of the CoM of the robot on the x-axis, the y-axis, and the z-axis, g represents acceleration of gravity. When the acceleration of the CoM of the robot on the z-axis satisfies the inequality $|\ddot{z}| \ll g$, the equations above can be simplified as $$x_p = x - \frac{z}{g}\ddot{x}$$

follows:

$$y_p = y - \frac{z}{g}\ddot{y}.$$

Figure 4:
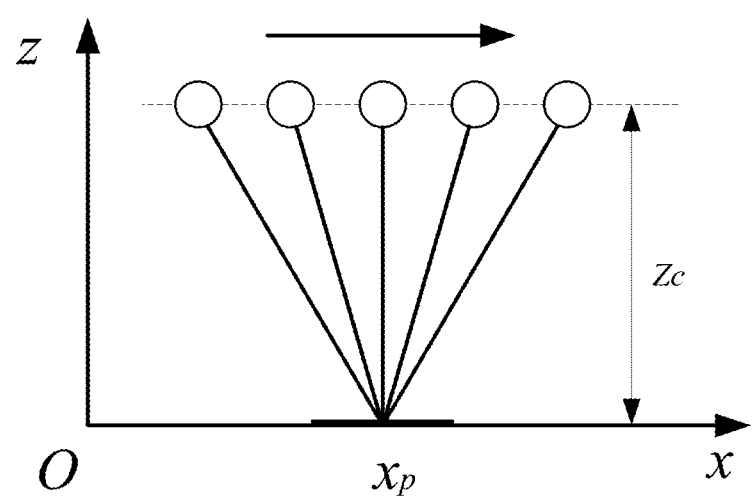
FIG. 4 shows a schematic diagram of a LIPM in a walking cycle.

FIG. 4 shows a schematic diagram of a LIPM model in a walking cycle. In the figure, the biped robot walks to the right, gait planning is performed along the x-axis and y-axis. The height of the CoM of the robot, which is measured along the z-axis, keeps unchanged.

Figure 5:
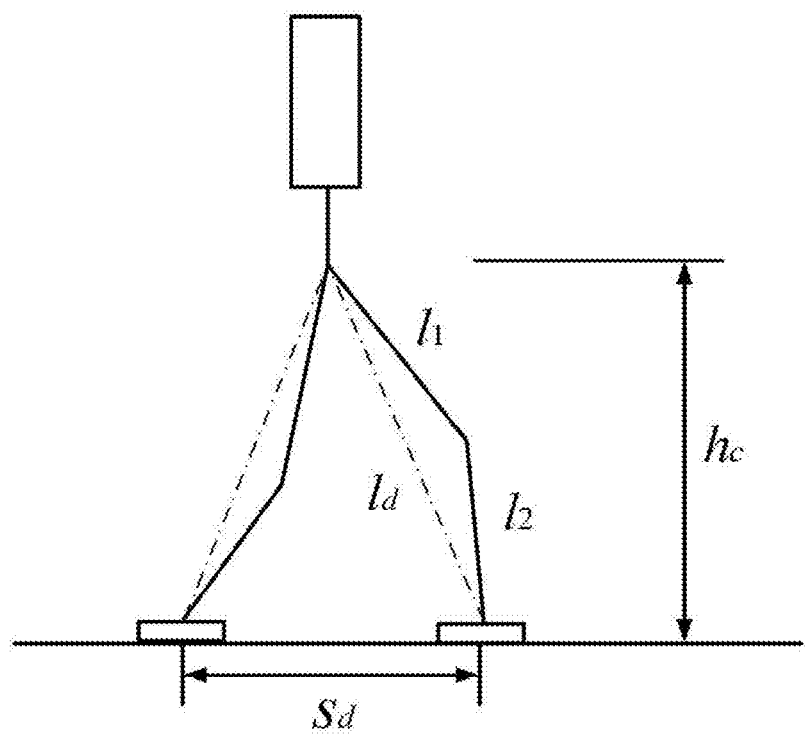
FIG. 5 shows a schematic diagram of a biped robot according to one embodiment.

FIG. 5 shows a schematic diagram of a biped robot. When the walking speed of the robot increases, it can be found that the actual leg length (that is equal to the sum of the length of the solid lines $l_1$ and $l_2$ in FIG. 4) of the biped robot is not enough to provide the desired leg length (that is equal to the length of the dotted line $l_d$ in FIG. 4) of LIPM. That is, when the step length is greater than a threshold value, the actual leg length is less than the desired leg length. As shown in FIG. 4, $s_d$ represents step length, $h_c$ represents the height of the CoM of the robot, and is equal to a preset constant value $z_c$. According to the Pythagorean theorem, the desired leg length $l_d$ of LIPM can be reduced by reducing the height of the center of mass $h_c$.

Figure 6:
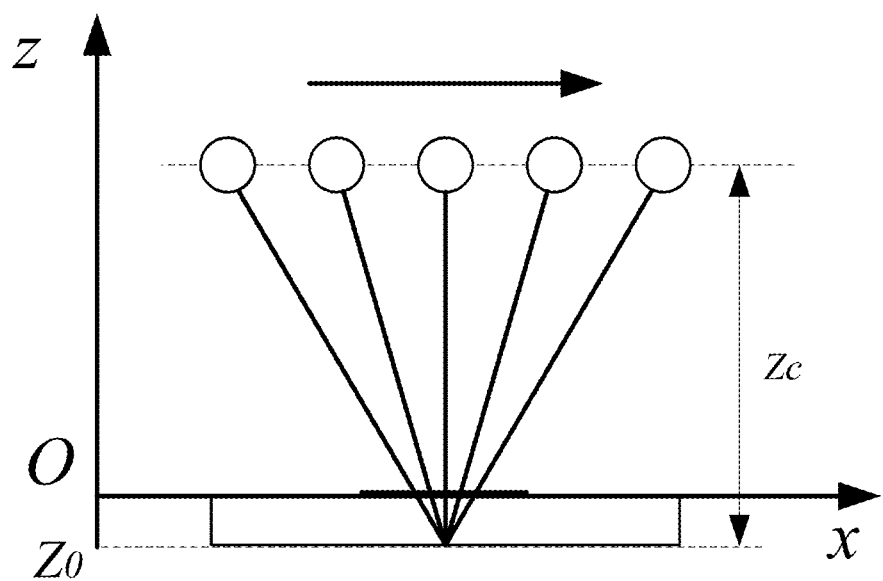
FIG. 6 shows a schematic diagram of LIPM model in which the height of the center of mass (CoM) of a robot is reduced.

Referring to FIG. 6, in one embodiment, the support point in the model of FIG. 3 can be moved down by $z_0$. The height of the CoM of the robot is reduced by $z_0$, i.e., $h_c = z_c - z_0$. Sine the height of the CoM is reduced, the required desired leg length will be reduced accordingly.

Studies on human walking patterns show that the waist during a normal walking cycle, the human waist moves up and down periodic. The biped robot does not need to have increased leg length at all times during the entire walking cycle. In addition, as the walking speed increases, the required amplitude of the reduction in the height of CoM will also increase, which will also increase the joint torque.

Figure 7:
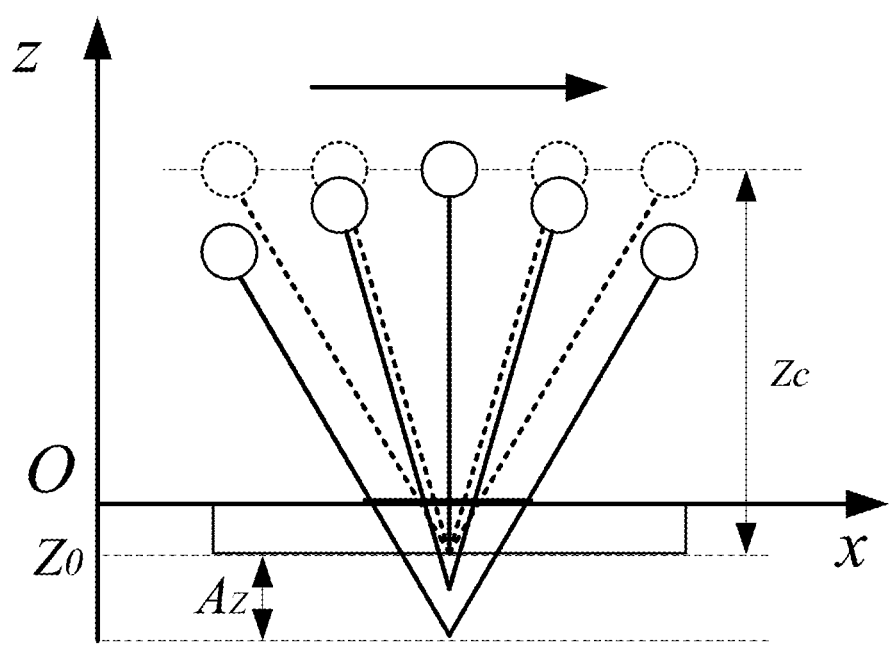
FIG. 7 shows a schematic diagram of LIPM considering reduction in height of the center of mass of a robot and the height fluctuation of the center of mass of the robot.

In the embodiment, a new gait planning model (i.e., variable-height LIPM, hereinafter referred to as v-LIPM) is created based on the LIPM, with the fluctuation of the position of the CoM of a robot and the reduction of the height of the CoM being considered. In the v-LIPM, the fluctuation of the position of the CoM is generated based on the vertical movement of the LIPM support point, which is decoupled from the horizontal movement of the LIPM. In the model shown in FIG. 7, $h_c = z_c - z_0 - A_z$, where $h_c$ represents the height of the CoM of a robot, $A_z$ represents the fluctuation amplitude of the CoM of the robot. The v-LIPM can not only reduce the amplitude of the reduction in the height of CoM, thereby reducing the joint torque, but also can effectively provide the leg length required for fast walking. In addition, the acceleration of the downward movement of the CoM increases the pressure of the supporting leg against the support surface and reduces the left and right deflection amplitude of the biped robot caused by the inertia of the swinging leg during fast walking.

Step S102: Perform a gait planning in each center of mass (CoM) timing period of the robot based on the variable-height linear inverted pendulum model.

Figure 8:
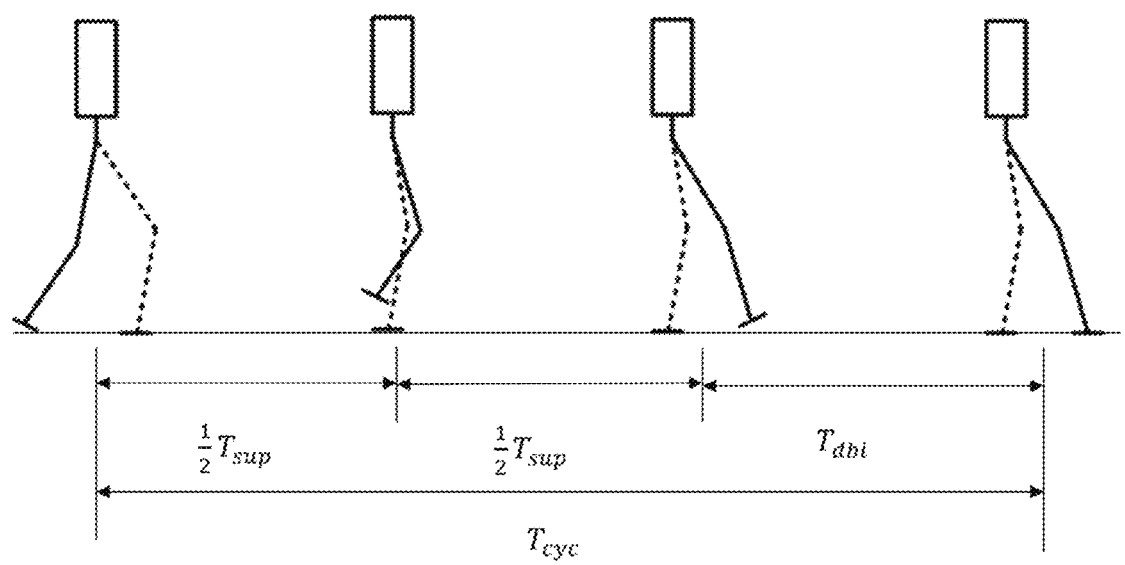
FIG. 8 is a schematic diagram showing a gait cycle of a robot.

FIG. 8 is a schematic diagram showing a gait cycle of a robot. In the figure, the dotted line represents the supporting leg, and the solid line represents the swinging leg. The bipedal walking mode is a process in which the two legs alternately become the swinging leg and the supporting leg. The duration of the single support is $T_{sup}$, the duration of the double support is $T_{dbl}$, and the duration of one gait cycle $T_{cyc}$ is equal to the sum of $T_{sup}$ and $T_{dbl}$.

The gait cycles of an entire walking process start from the single support phase, and the time when the foot of the swing leg is lifted off the support surface is expressed as $t_s = 0$. The time when the foot of the swing leg is lifted to the highest point is expressed as $t_s = 1/2 T_{sup}$. The time of the end of the single support phase is expressed as $t_s = T_{sup}$. The time when the next single support phase starts is expressed as $t_s = T_{cyc}$. This timing method is called gait timing period.

In order to better describe the gait planning method, a CoM timing period is introduced in one embodiment of the present disclosure. The time when the foot of the swing leg is lifted to the highest point is set to be the beginning of the CoM timing period. The relationship between the CoM timing period and gait timing period is expressed by the following equation: $t = t_s - 1/2 T_{sup}$. Unless otherwise specified below, the CoM timing period is used in all of the embodiments of the present disclosure.

Figure 9:
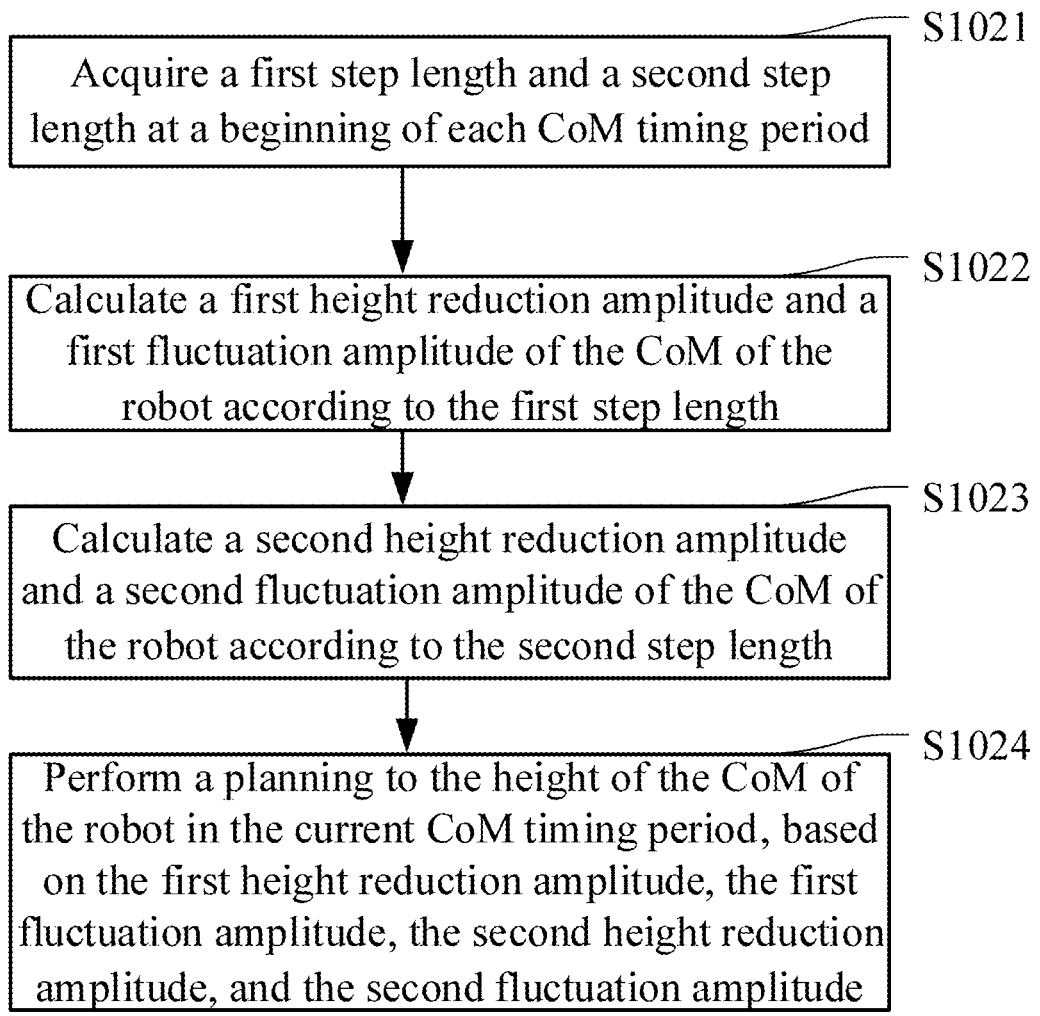
FIG. 9 is an exemplary flowchart of a gait planning method implemented in each CoM timing period of a robot, based on a variable-height LIPM.

Referring to FIG. 9, in one embodiment, the step S102 may include the following steps.

Step S1021: Acquire a first step length and a second step length at a beginning of each CoM timing period, wherein the first step length is a step length of the robot in a current CoM timing period, and the second step length is a step length of the robot in a previous CoM timing period.

Step S1022: Calculate a first height reduction amplitude and a first fluctuation amplitude of the CoM of the robot according to the first step length, wherein the first height reduction amplitude represents an amplitude of reduction in height of the CoM of the robot in the current CoM timing period, and the first fluctuation amplitude represents a vertical distance between a highest position of the CoM of the robot and a lowest position of the CoM of the robot in the current CoM timing period. In the embodiment, since the first height reduction amplitude and a first fluctuation amplitude of the CoM of the robot are calculated based on the first step length, the first step length increases when the walking speed increases, and the first height reduction amplitude and a first fluctuation amplitude increase accordingly.

In one embodiment, the first height reduction amplitude and the first fluctuation amplitude can be calculated according to formulas as follows:

$$z_0 = g_1(s_d) = \begin{cases} a_1 * |s_d| + b_1, & |s_d| \leq s_{d2} \\ z_{0lim}, & |s_d| > s_{d2} \end{cases}$$

$$A_z = g_2(s_d) = \begin{cases} A_{zlim}, & |s_d| \leq s_{d1} \\ a_2 * |s_d| + b_2, & |s_d| > s_{d1} \end{cases},$$

where $s_d$ represents the first step length, $s_{d1}$ represents a threshold of the first step length (i.e., the upper limit of the stride length of a small gait), $s_{d2}$ represents a threshold of the second step length (i.e., the upper limit of the stride length of a moderate gait), the upper limit of the stride length of a large gait may also be used, and all the step length satisfies the following inequality: $|S_d| \leq s_{d3}$; $a_1$, $b_1$, $a_2$, and $b_2$ represent preset coefficients; $g_1$ represents a preset first function, $g_2$ represents a preset second function; $z_{0lim}$ represents a preset upper limit of the first height reduction amplitude, $z_0$ represents the first height reduction amplitude; $A_{zlim}$ represents a preset lower limit of the first fluctuation amplitude, and $A_z$ represents the first fluctuation amplitude. Generally, $A_{zlim}$ can be set to be equal to 0.

Step S1023: Calculate a second height reduction amplitude and a second fluctuation amplitude of the CoM of the robot according to the second step length, wherein the second height reduction amplitude represents an amplitude of reduction in height of the CoM of the robot in the previous CoM timing period, and the second fluctuation amplitude represents a vertical distance between a highest position of the CoM of the robot and a lowest position of the CoM of the robot in the previous CoM timing period.

In one embodiment, the second height reduction amplitude and the second fluctuation amplitude of the CoM of the robot can be calculated according to formulas as follows:

$$z'_0 = g_1(s'_d) = \begin{cases} a_1 * |s'_d| + b_1, & |s'_d| \leq s_{d2} \\ z_{0lim}, & |s'_d| > s_{d2} \end{cases}$$

$$A'_z = g_2(s'_d) = \begin{cases} A_{zlim}, & |s'_d| \leq s_{d1} \\ a_2 * |s'_d| + b_2, & |s'_d| > s_{d1} \end{cases},$$

where $s_d'$ represents the second step length, $z_0'$ represents the second height reduction amplitude, $A_z'$ represents the second fluctuation amplitude.

Step S1024: Perform a planning to the height of the CoM of the robot in the current CoM timing period, based on the first height reduction amplitude, the first fluctuation amplitude, the second height reduction amplitude, and the second fluctuation amplitude.

Specifically, first, determine an initial value and a terminal value of a magnitude of change in the height of the CoM of the robot at each gait phase, based on the first height reduction amplitude, the first fluctuation amplitude, the second height reduction amplitude, and the second fluctuation amplitude. In one embodiment, during the gait phase $0 \leq t < 1/2 T_{cyc}$, the initial value is equal to $z_0'$, and the terminal value is equal to the sum of $z_0$ and $A_z$. During the gait phase $1/2 T_{cyc} \leq t < T_{cyc}$, the initial value is equal to sum of $z_0$ and $A_z$, and the terminal value is equal to $z_0'$.

Second, perform curve fitting according to the initial values and the terminal values to obtain the magnitude of change in the height of the CoM of the robot in the current CoM timing period.

In one embodiment, a trajectory planning algorithm can be used to determine a smooth motion curve that transitions from the initial value to the end value. The motion curve includes, but is not limited to, fifth-degree polynomial, third-degree polynomial, cosine curve, cycloid curve, S-shaped curve, and bangbang curve. Take a fifth degree polynomial curve as an example, and expressed by an equation as follows:

$$f(x_0, x_1, v_0, v_1, a_0, a_1, t_0, t_1, t) = q_0 + q_1 t + q_2 t^2 + q_3 t^3 + q_4 t^4 + q_5 t^5,$$

where $x_0$ represents the initial value, $x_1$ represent the terminal value, $v_0$ represents an initial speed corresponding to the initial value, $v_1$ represents a terminal speed corresponding to the terminal value, $a_0$ represents an initial acceleration corresponding to the initial value, $a_1$ represents a terminal acceleration corresponding to the terminal value, t represents time variable, $t_0$ represents the initial time corresponding to the initial value, $t_1$ represents the terminal time corresponding to the terminal value, and $q_1$, $q_2$, $q_3$, $q_4$, and $q_5$ are coefficients of a fifth degree polynomial of the equation above. In one embodiment, $q_1$, $q_2$, $q_3$, $q_4$, and $q_5$ can be solved obtained by solving the following linear equation: $Ax = b$, where:

$$A = \begin{bmatrix} t_0^5 & t_0^4 & t_0^3 & t_0^2 & t_0 & 1 \\ 5t_0^4 & 4t_0^3 & 3t_0^2 & 2t_0 & 1 & 0 \\ 20t_0^3 & 12t_0^3 & 6t_0 & 2 & 0 & 0 \\ t_1^5 & t_1^4 & t_1^3 & t_1^2 & t_1 & 1 \\ 5t_1^4 & 4t_1^3 & 3t_1^2 & 2t_1 & 1 & 0 \\ 20t_1^3 & 12t_1^2 & 6t_1 & 2 & 0 & 0 \end{bmatrix},$$

$x = [q_5, q_4, q_3, q_2, q_1, q_0]^T$, and $b = [x_0, v_0, a_0, x_1, v_1, a_1]^T$.

In one embodiment, $v_0$, $v_1$, $a_0$, $a_1$, and $t_0$ can be set to be equal to 0, and $t_1$ is set to be equal to T, i.e., the length of time from an initial moment to an end moment. The equation describing the motion curve can then be simplified as follows:

$$f(x_0, x_1, T, t) = q_0 + q_1 t + q_2 t^2 + q_3 t^3 + q_4 t^4 + q_5 t^5 = \\ x_0 + (x_1 - x_0)\left(\frac{6}{T^5} t^5 - \frac{15}{T^4} t^4 + \frac{10}{T^3} t^3\right).$$

In one embodiment, the magnitude of change in the height of the CoM of the robot in the current CoM timing period can be calculated according to a formula as follows:

$$z_d = \begin{cases} f\left(z_0', z_0 + A_z, \frac{1}{2} T_{cyc}, t\right), & 0 \leq t < \frac{1}{2} T_{cyc} \\ f\left(z_0 + A_z, z_0, \frac{1}{2} T_{cyc}, t - \frac{1}{2} T_{cyc}\right), & \frac{1}{2} T_{cyc} \leq t < T_{cyc} \end{cases},$$

where $z_d$ represents the magnitude of change in the height of the CoM of the robot in the current CoM timing period.

Finally, perform a planning to the height of the CoM of the robot in the current CoM timing period based on the magnitude of change in the height of the CoM of the robot. That is, $z=z_c-z_d$, where z represents the height of the CoM of the robot in the current CoM timing period.

Figure 10:
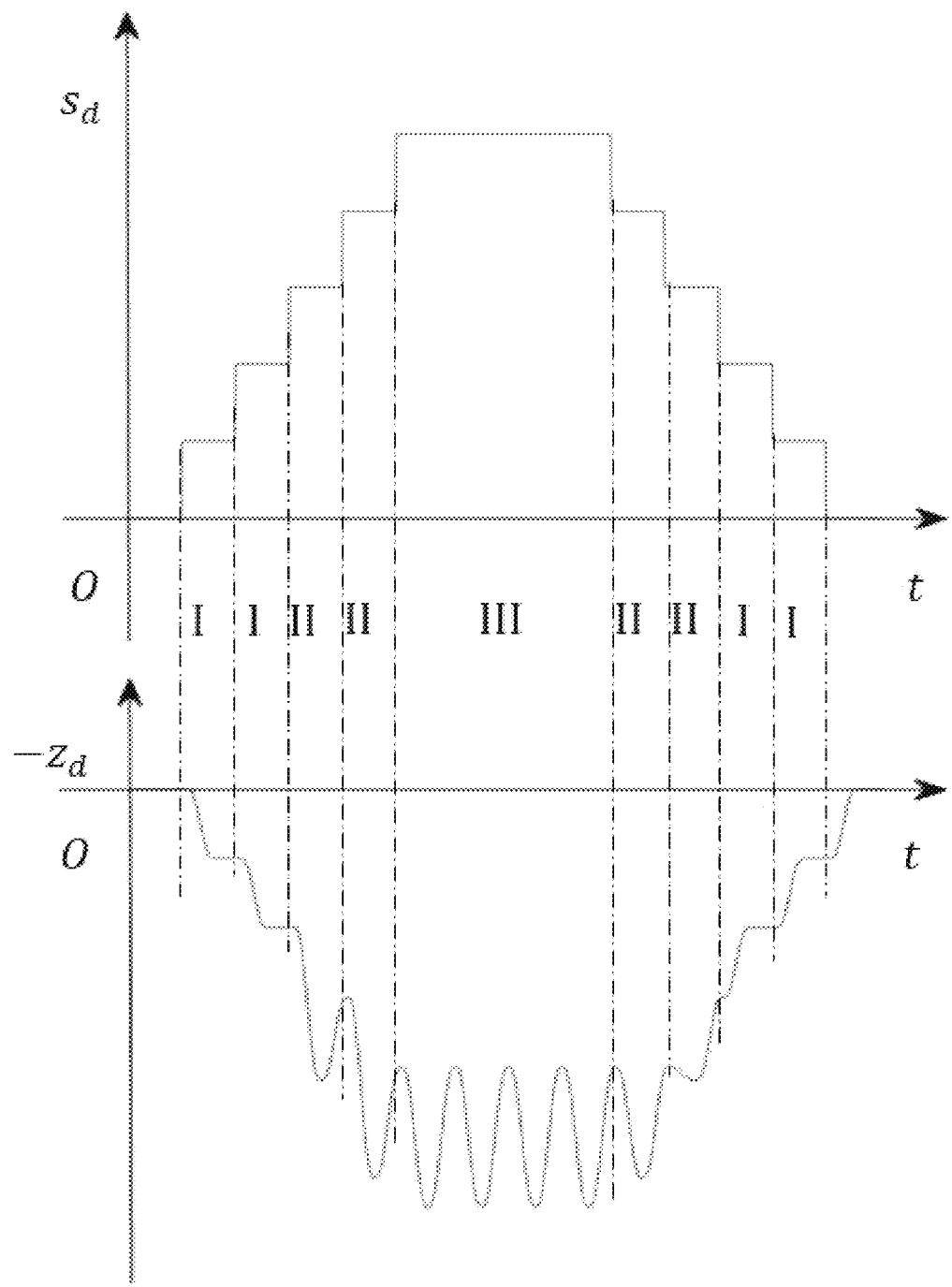
FIG. 10 shows a curve reflecting relationship among the magnitude of change in the height of the CoM, the step length, and the CoM timing period.

FIG. 10 shows the relationship among the magnitude of change $z_d$ in the height of the CoM, the step length $s_d$, and the CoM timing period. The diagram in FIG. 10 is divided into three regions I, II, and III. During the period of the region I (also referred to as a small gait region), there is only the height reduction of the CoM, and the step length satisfies the inequality $|s_d| \le s_{d1}$. During the period of the region II (also referred to as a moderate gait region), there are the height reduction of the CoM and the height reduction of the CoM, and the step length satisfies the inequality $s_{d1} < |s_d| \le s_{d2}$. During the period of the region III (also referred to as a large gait region), there is only planning of the height reduction of the CoM, and the step length satisfies the inequality $s_{d2} < |s_d| \le s_{d3}$.

With the method above, on the basis of LIPM, the height reduction of the CoM and the height fluctuation of the CoM are considered, which can effectively provide the leg length required for fast walking.

Referring to FIG. 11, in one embodiment, a gait planning device includes a model building module 1001 and a gait planning module 1002. The model building module 1001 is configured to build a variable-height linear inverted pendulum model. In the embodiment, the variable-height linear inverted pendulum model is a modified linear inverted pendulum model (LIPM) based on variable height. In the model, the height of the center of mass (CoM) of a robot is reduced and the fluctuation of the position of the center of mass (CoM) of a robot is included. The gait planning module 1002 is configured to perform a gait planning in each center of mass (CoM) timing period of the robot based on the variable-height linear inverted pendulum model.

In one embodiment, the gait planning module 1002 may include an acquiring module, a first calculating module, a second calculating module, and a CoM height planning module. The acquiring module is configured to acquire a first step length and a second step length at a beginning of each CoM timing period, wherein the first step length is a step length of the robot in a current CoM timing period, and the second step length is a step length of the robot in a previous CoM timing period. The first calculating module is configured to calculate a first height reduction amplitude and a first fluctuation amplitude of the CoM of the robot according to the first step length, wherein the first height reduction amplitude represents an amplitude of reduction in height of the CoM of the robot in the current CoM timing period, and the first fluctuation amplitude represents a vertical distance between a highest position of the CoM of the robot and a lowest position of the CoM of the robot in the current CoM timing period. The second calculating module is configured to calculate a second height reduction amplitude and a second fluctuation amplitude of the CoM of the robot according to the second step length, wherein the second height reduction amplitude represents an amplitude of reduction in height of the CoM of the robot in the previous CoM timing period, and the second fluctuation amplitude represents a vertical distance between a highest position of the CoM of the robot and a lowest position of the CoM of the robot in the previous CoM timing period. The CoM height planning module is configured to perform a planning to the height of the CoM of the robot in the current CoM timing period, based on the first height reduction amplitude, the first fluctuation amplitude, the second height reduction amplitude, and the second fluctuation amplitude.

In one embodiment, the first calculating module may include a height reduction amplitude calculating module that is configured to calculate the first height reduction amplitude according to a formula as follows:

$$z_0 = \begin{cases} a_1 * |s_d| + b_1, & |s_d| \le s_{d2} \\ z_{0lim}, & |s_d| > s_{d2} \end{cases},$$

where $s_d$ represents the first step length, $s_{d2}$ represents a threshold of the second step length, $a_1$ and $b_1$ represents preset coefficients, $z_{0lim}$ represents a preset upper limit of the first height reduction amplitude, and $z_0$ represents the first height reduction amplitude.

In one embodiment, the first calculating module may include a fluctuation amplitude calculating module that is configured to calculate the first fluctuation amplitude of the CoM of the robot according to a formula as follows:

$$A_z = \begin{cases} A_{zlim}, & |s_d| \le s_{d1} \\ a_2 * |s_d| + b_2, & |s_d| > s_{d1} \end{cases},$$

where $s_d$ represents the first step length, $s_{d1}$ represents a threshold of the first step length, $a_2$ and $b_2$ represents preset coefficients, $A_{zlim}$ represents a preset lower limit of the first fluctuation amplitude, and $A_z$ represents the first fluctuation amplitude.

In one embodiment, the CoM height planning module may include a value determining module, a curve fitting module, and a height planning module. The value determining module is configured to determine an initial value and a terminal value of a magnitude of change in the height of the CoM of the robot at each gait phase, based on the first height reduction amplitude, the first fluctuation amplitude, the second height reduction amplitude, and the second fluctuation amplitude. The curve fitting module is configured to perform curve fitting according to the initial values and the terminal values to obtain the magnitude of change in the height of the CoM of the robot in the current CoM timing period. The height planning module is configured to perform a planning to the height of the CoM of the robot in the current CoM timing period based on the magnitude of change in the height of the CoM of the robot.

In one embodiment, the magnitude of change in the height of the CoM of the robot in the current CoM timing period is calculated according to a formula as follows:

$$z_d = \begin{cases} f\left(z'_0, z_0 + A_z, \frac{1}{2}T_{cyc}, t\right), & 0 \le t < \frac{1}{2}T_{cyc} \\ f\left(z_0 + A_z, z_0, \frac{1}{2}T_{cyc}, t - \frac{1}{2}T_{cyc}\right) & \frac{1}{2}T_{cyc} \le t < T_{cyc} \end{cases},$$

where $f(x_0,x_1,T,t)$ represents a preset motion curve, $x_0$ represents the initial value (i.e., the value when t is equal to 0), $x_1$ represents the terminal value (i.e, the value when t is equal to T), T represents a length of time from an initial moment to an end moment, t represents a time variable of the CoM timing period, $z_0$ represents the first height reduction amplitude, $A_z$ represents the first fluctuation amplitude, $z_0'$ represents the second height reduction amplitude, $T_{cyc}$ represents the duration of the current CoM timing period of the robot, and $z_d$ represents the magnitude of change in the height of the CoM of the robot.

In one embodiment, the motion curve is expressed by an equation as follows:

$$f(x_0, x_1, T, t) =$$
$$q_0 + q_1 t + q_2 t^2 + q_3 t^3 + q_4 t^4 + q_5 t^5 = x_0 + (x_1 - x_0)\left(\frac{6}{T^5}t^5 - \frac{15}{T^4}t^4 + \frac{10}{T^3}t^3\right),$$

where $q_0$, $q_1$, $q_2$, $q_3$, $q_4$, and $q_5$ are coefficients of a fifth degree polynomial of the equation above.

Those skilled in the art can clearly understand that, for the convenience and conciseness of the description, the specific working processes of the devices, modules and units described above can refer to the corresponding processes in the foregoing method embodiments, which will not be repeated here.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented gait planning method executed by one or more processors of a robot, the method comprising:
performing a gait planning in each center of mass (CoM) timing period of the robot based on a variable-height linear inverted pendulum model;
wherein performing the gait planning in each center of mass (CoM) timing period of the robot based on a variable-height linear inverted pendulum model, comprises:
acquiring a first step length and a second step length at a beginning of each CoM timing period, wherein the first step length is a step length of the robot in a current CoM timing period, and the second step length is a step length of the robot in a previous CoM timing period;
calculating a first height reduction amplitude and a first fluctuation amplitude of the CoM of the robot according to the first step length, wherein the first height reduction amplitude represents an amplitude of reduction in height of the CoM of the robot in the current CoM timing period, and the first fluctuation amplitude represents a vertical distance between a highest position of the CoM of the robot and a lowest position of the CoM of the robot in the current CoM timing period;
calculating a second height reduction amplitude and a second fluctuation amplitude of the CoM of the robot according to the second step length, wherein the second height reduction amplitude represents an amplitude of reduction in height of the CoM of the robot in the previous CoM timing period, and the second fluctuation amplitude represents a vertical distance between a highest position of the CoM of the robot and a lowest position of the CoM of the robot in the previous CoM timing period; and
performing a planning to the height of the CoM of the robot in the current CoM timing period, based on the first height reduction amplitude, the first fluctuation amplitude, the second height reduction amplitude, and the second fluctuation amplitude.

2. The method according to claim 1, wherein the first height reduction amplitude is calculated according to a formula as follows:

$$z_0 = \begin{cases} a_1 * |s_d| + b_1, & |s_d| \le s_{d2} \\ z_{0lim}, & |s_d| > s_{d2} \end{cases},$$

where $s_d$ represents the first step length, $s_{d2}$ represents a threshold of the second step length, $a_1$ and $b_1$ represents preset coefficients, $z_{0lim}$ represents a preset upper limit of the first height reduction amplitude, and $z_0$ represents the first height reduction amplitude.

3. The method according to claim 1, wherein the first fluctuation amplitude is calculated according to a formula as follows:

$$A_z = \begin{cases} A_{zlim}, & |s_d| \le s_{d1} \\ a_2 * |s_d| + b_2, & |s_d| > s_{d1} \end{cases},$$

where $s_d$ represents the first step length, $s_{d1}$ represents a threshold of the first step length, $a_2$ and $b_2$ represents preset coefficients, $A_{zlim}$ represents a preset lower limit of the first fluctuation amplitude, and $A_z$ represents the first fluctuation amplitude.

4. The method according to claim 1, wherein performing the planning to the height of the CoM of the robot in the current CoM timing period, based on the first height reduction amplitude, the first fluctuation amplitude, the second height reduction amplitude, and the second fluctuation amplitude, comprises:
determining an initial value and a terminal value of a magnitude of change in the height of the CoM of the robot at each gait phase, based on the first height reduction amplitude, the first fluctuation amplitude, the second height reduction amplitude, and the second fluctuation amplitude;
performing curve fitting according to the initial values and the terminal values to obtain the magnitude of change in the height of the CoM of the robot in the current CoM timing period; and
performing a planning to the height of the CoM of the robot in the current CoM timing period based on the magnitude of change in the height of the CoM of the robot.

5. The method according to claim 4, wherein the magnitude of change in the height of the CoM of the robot in the current CoM timing period is calculated according to a formula as follows:

$$z_d = \begin{cases} f\left(z'_0, z_0 + A_z, \frac{1}{2}T_{cyc}, t\right), & 0 \le t < \frac{1}{2}T_{cyc} \\ f\left(z_0 + A_z, z_0, \frac{1}{2}T_{cyc}, t - \frac{1}{2}T_{cyc}\right), & \frac{1}{2}T_{cyc} \le t < T_{cyc} \end{cases},$$

where $f(x_0,x_1,T,t)$ represents a preset motion curve, $x_0$ represents the initial value, $x_1$ represents the terminal value, $T$ represents a length of time from an initial moment to an end moment, $t$ represents a time variable of the CoM timing period, $z_0$ represents the first height reduction amplitude, $A_z$ represents the first fluctuation amplitude, $z_0'$ represents the second height reduction amplitude, $T_{cyc}$ represents the duration of the current CoM timing period of the robot, and $z_d$ represents the magnitude of change in the height of the CoM of the robot.

6. The method according to claim 5, wherein the motion curve is expressed by an equation as follows:

$$f(x_0, x_1, T, t) = $$
$$q_0 + q_1 t + q_2 t^2 + q_3 t^3 + q_4 t^4 + q_5 t^5 = x_0 + (x_1 - x_0)\left(\frac{6}{T^5}t^5 - \frac{15}{T^4}t^4 + \frac{10}{T^3}t^3\right),$$

where $q_0$, $q_1$, $q_2$, $q_3$, $q_4$, and $q_5$ are coefficients of a fifth degree polynomial of the equation above.

7. A non-transitory computer-readable storage medium storing one or more programs to be executed in a robot, the one or more programs, when being executed by one or more processors of the robot, causing the robot to perform processing comprising:
performing a gait planning in each center of mass (CoM) timing period of the robot based on a variable-height linear inverted pendulum model;
wherein performing the gait planning in each center of mass (CoM) timing period of the robot based on a variable-height linear inverted pendulum model, comprises:
acquiring a first step length and a second step length at a beginning of each CoM timing period, wherein the first step length is a step length of the robot in a current CoM timing period, and the second step length is a step length of the robot in a previous CoM timing period;

calculating a first height reduction amplitude and a first fluctuation amplitude of the CoM of the robot according to the first step length, wherein the first height reduction amplitude represents an amplitude of reduction in height of the CoM of the robot in the current CoM timing period, and the first fluctuation amplitude represents a vertical distance between a highest position of the CoM of the robot and a lowest position of the CoM of the robot in the current CoM timing period;

calculating a second height reduction amplitude and a second fluctuation amplitude of the CoM of the robot according to the second step length, wherein the second height reduction amplitude represents an amplitude of reduction in height of the CoM of the robot in the previous CoM timing period, and the second fluctuation amplitude represents a vertical distance between a highest position of the CoM of the robot and a lowest position of the CoM of the robot in the previous CoM timing period; and performing a planning to the height of the CoM of the robot in the current CoM timing period, based on the first height reduction amplitude, the first fluctuation amplitude, the second height reduction amplitude, and the second fluctuation amplitude.

8. The non-transitory computer-readable storage medium according to claim 7, wherein the first height reduction amplitude is calculated according to a formula as follows:

$$z_0 = \begin{cases} a_1 * |s_d| + b_1, & |s_d| \leq s_{d2} \\ z_{0lim}, & |s_d| > s_{d2} \end{cases},$$

where $s_d$ represents the first step length, $s_{d2}$ represents a threshold of the second step length, $a_1$ and $b_1$ represents preset coefficients, $z_{0lim}$ represents a preset upper limit of the first height reduction amplitude, and $z_0$ represents the first height reduction amplitude.

9. The non-transitory computer-readable storage medium according to claim 7, wherein the first fluctuation amplitude is calculated according to a formula as follows:

$$A_z = \begin{cases} A_{zlim}, & |s_d| \leq s_{d1} \\ a_2 * |s_d| + b_2, & |s_d| > s_{d1} \end{cases},$$

where $s_d$ represents the first step length, $s_{d1}$ represents a threshold of the first step length, $a_2$ and $b_2$ represents preset coefficients, $A_{zlim}$ represents a preset lower limit of the first fluctuation amplitude, and $A_z$ represents the first fluctuation amplitude.

10. The non-transitory computer-readable storage medium according to claim 7, wherein performing the planning to the height of the CoM of the robot in the current CoM timing period, based on the first height reduction amplitude, the first fluctuation amplitude, the second height reduction amplitude, and the second fluctuation amplitude, comprises:

determining an initial value and a terminal value of a magnitude of change in the height of the CoM of the robot at each gait phase, based on the first height reduction amplitude, the first fluctuation amplitude, the second height reduction amplitude, and the second fluctuation amplitude;

performing curve fitting according to the initial values and the terminal values to obtain the magnitude of change in the height of the CoM of the robot in the current CoM timing period; and performing a planning to the height of the CoM of the robot in the current CoM timing period based on the magnitude of change in the height of the CoM of the robot.

11. The non-transitory computer-readable storage medium according to claim 10, wherein the magnitude of change in the height of the CoM of the robot in the current CoM timing period is calculated according to a formula as follows:

$$z_d = \begin{cases} f\left(z_0', z_0 + A_z, \frac{1}{2}T_{cyc}, t\right), & 0 \leq t < \frac{1}{2}T_{cyc} \\ f\left(z_0 + A_z, z_0, \frac{1}{2}T_{cyc}, t - \frac{1}{2}T_{cyc}\right), & \frac{1}{2}T_{cyc} \leq t < T_{cyc} \end{cases},$$

where $f(x_0, x_1, T, t)$ represents a preset motion curve, $x_0$ represents the initial value, $x_1$ represents the terminal value, T represents a length of time from an initial moment to an end moment, t represents a time variable of the CoM timing period, $z_0$ represents the first height reduction amplitude, $A_z$ represents the first fluctuation amplitude, $z_0'$ represents the second height reduction amplitude, $T_{cyc}$ represents the duration of the current CoM timing period of the robot, and $z_d$ represents the magnitude of change in the height of the CoM of the robot.

12. The non-transitory computer-readable storage medium according to claim 11, wherein the motion curve is expressed by an equation as follows:

$$f(x_0, x_1, T, t) =$$
$$q_0 + q_1 t + q_2 t^2 + q_3 t^3 + q_4 t^4 + q_5 t^5 = x_0 + (x_1 - x_0)\left(\frac{6}{T^5}t^5 - \frac{15}{T^4}t^4 + \frac{10}{T^3}t^3\right),$$

where $q_0$, $q_1$, $q_2$, $q_3$, $q_4$, and $q_5$ are coefficients of a fifth degree polynomial of the equation above.

13. A robot comprising:
one or more processors;
a memory; and
one or more programs, wherein the one or more programs are stored in the memory and configured to be executed by the one or more processors, the one or more programs comprises:
instructions for performing a gait planning in each center of mass (CoM) timing period of the robot based on a variable-height linear inverted pendulum model;
wherein performing the gait planning in each center of mass (CoM) timing period of the robot based on a variable-height linear inverted pendulum model, comprises:
acquiring a first step length and a second step length at a beginning of each CoM timing period, wherein the first step length is a step length of the robot in a current CoM timing period, and the second step length is a step length of the robot in a previous CoM timing period;
calculating a first height reduction amplitude and a first fluctuation amplitude of the CoM of the robot according to the first step length, wherein the first height reduction amplitude represents an amplitude of reduction in height of the CoM of the robot in the current CoM timing period, and the first fluctuation amplitude represents a vertical distance between a highest position of the CoM of the robot and a lowest position of the CoM of the robot in the current CoM timing period;

calculating a second height reduction amplitude and a second fluctuation amplitude of the CoM of the robot according to the second step length, wherein the second height reduction amplitude represents an amplitude of reduction in height of the CoM of the robot in the previous CoM timing period, and the second fluctuation amplitude represents a vertical distance between a highest position of the CoM of the robot and a lowest position of the CoM of the robot in the previous CoM timing period; and performing a planning to the height of the CoM of the robot in the current CoM timing period, based on the first height reduction amplitude, the first fluctuation amplitude, the second height reduction amplitude, and the second fluctuation amplitude.

14. The robot according to claim 13, wherein the first height reduction amplitude is calculated according to a formula as follows:

$$z_0 = \begin{cases} a_1 * |s_d| + b_1, & |s_d| \le s_{d2} \\ z_{0lim}, & |s_d| > s_{d2} \end{cases},$$

where $s_d$ represents the first step length, $s_{d2}$ represents a threshold of the second step length, $a_1$ and $b_1$ represents preset coefficients, $z_{0lim}$ represents a preset upper limit of the first height reduction amplitude, and $z_0$ represents the first height reduction amplitude.

15. The robot according to claim 13, wherein the first fluctuation amplitude is calculated according to a formula as follows:

$$A_z = \begin{cases} A_{zlim}, & |s_d| \le s_{d1} \\ a_2 * |s_d| + b_2, & |s_d| > s_{d1} \end{cases},$$

where $s_d$ represents the first step length, $s_{d1}$ represents a threshold of the first step length, $a_2$ and $b_2$ represents preset coefficients, $A_{zlim}$ represents a preset lower limit of the first fluctuation amplitude, and $A_z$ represents the first fluctuation amplitude.

16. The robot according to claim 13, wherein performing the planning to the height of the CoM of the robot in the current CoM timing period, based on the first height reduction amplitude, the first fluctuation amplitude, the second height reduction amplitude, and the second fluctuation amplitude, comprises:

determining an initial value and a terminal value of a magnitude of change in the height of the CoM of the robot at each gait phase, based on the first height reduction amplitude, the first fluctuation amplitude, the second height reduction amplitude, and the second fluctuation amplitude;

performing curve fitting according to the initial values and the terminal values to obtain the magnitude of change in the height of the CoM of the robot in the current CoM timing period; and performing a planning to the height of the CoM of the robot in the current CoM timing period based on the magnitude of change in the height of the CoM of the robot.

17. The robot according to claim 16, wherein the magnitude of change in the height of the CoM of the robot in the current CoM timing period is calculated according to a formula as follows:

$$z_d = \begin{cases} f\left(z_0', z_0 + A_z, \frac{1}{2}T_{cyc}, t\right), & 0 \le t < \frac{1}{2}T_{cyc} \\ f\left(z_0 + A_z, z_0, \frac{1}{2}T_{cyc}, t - \frac{1}{2}T_{cyc}\right), & \frac{1}{2}T_{cyc} \le t < T_{cyc} \end{cases},$$

where $f(x_0, x_1, T, t)$ represents a preset motion curve, $x_0$ represents the initial value, $x_1$ represents the terminal value, T represents a length of time from an initial moment to an end moment, t represents a time variable of the CoM timing period, $z_0$ represents the first height reduction amplitude, $A_z$ represents the first fluctuation amplitude, $z_0'$ represents the second height reduction amplitude, $T_{cyc}$ represents the duration of the current CoM timing period of the robot, and $z_d$ represents the magnitude of change in the height of the CoM of the robot.

18. The robot according to claim 17, wherein the motion curve is expressed by an equation as follows:

$$f(x_0, x_1, T, t) =$$
$$q_0 + q_1 t + q_2 t^2 + q_3 t^3 + q_4 t^4 + q_5 t^5 = x_0 + (x_1 - x_0)\left(\frac{6}{T^5}t^5 - \frac{15}{T^4}t^4 + \frac{10}{T^3}t^3\right),$$

where $q_0$, $q_1$, $q_2$, $q_3$, $q_4$, and $q_5$ are coefficients of a fifth degree polynomial of the equation above.

* * * * *